UNITED STATES PATENT OFFICE.

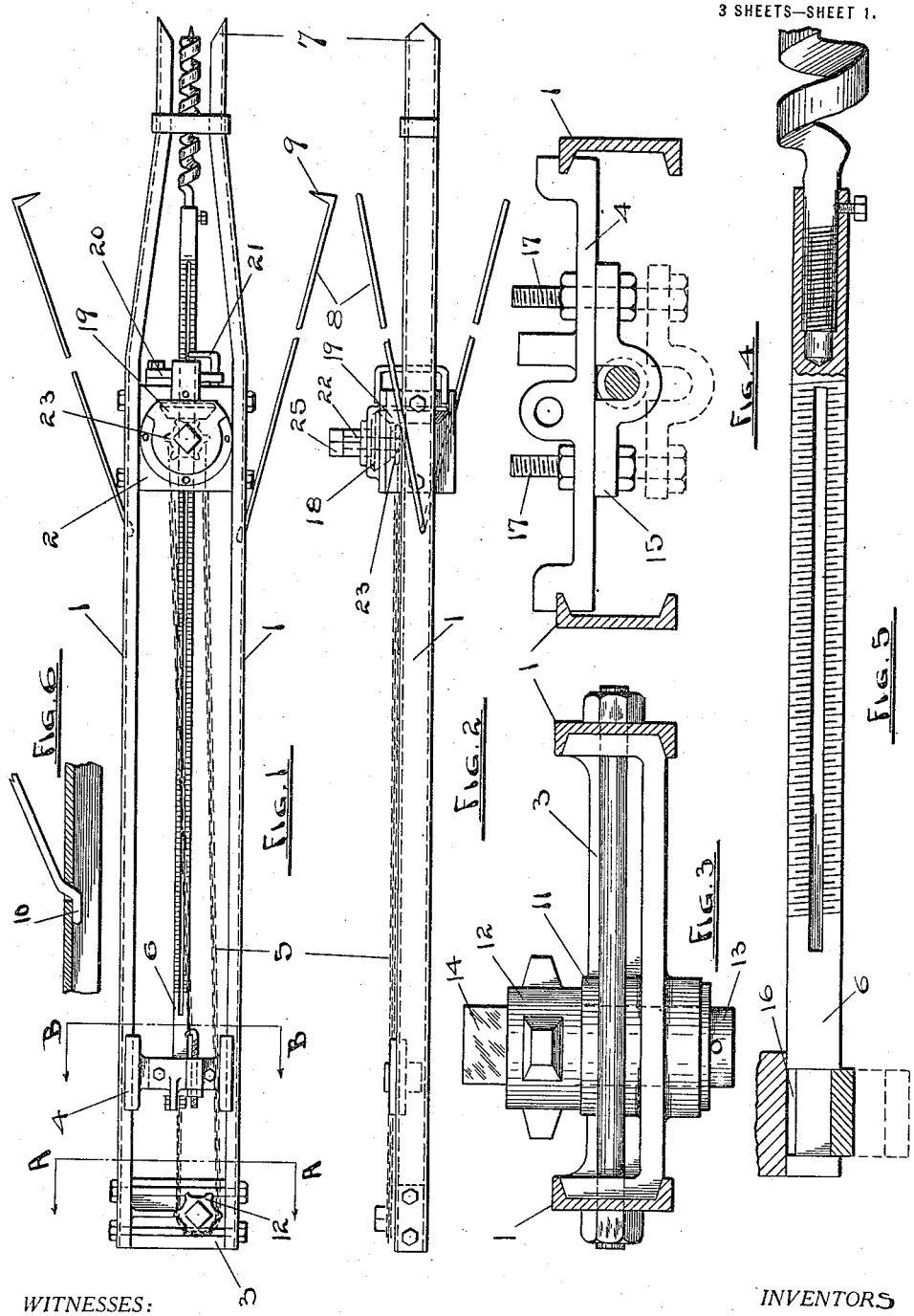

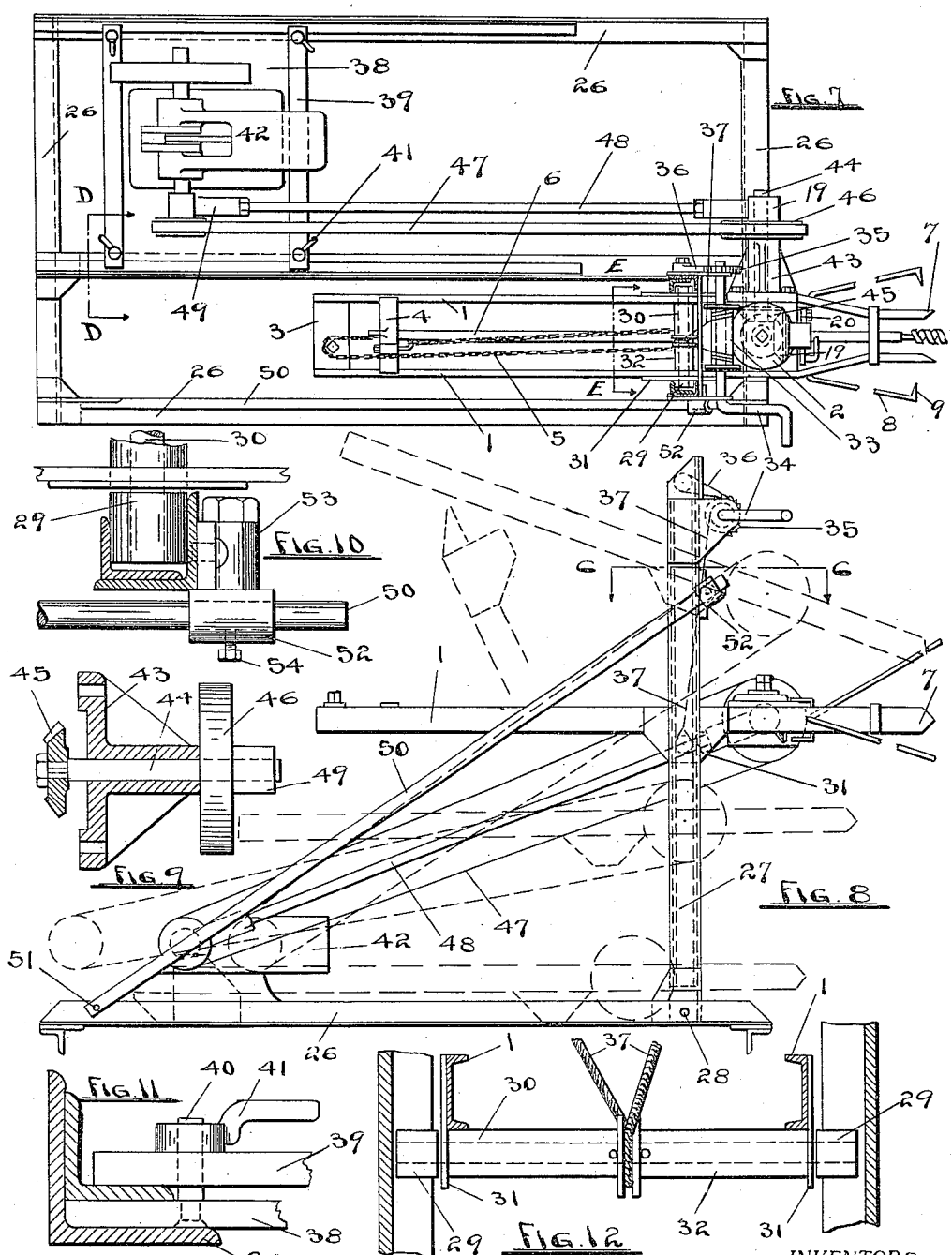

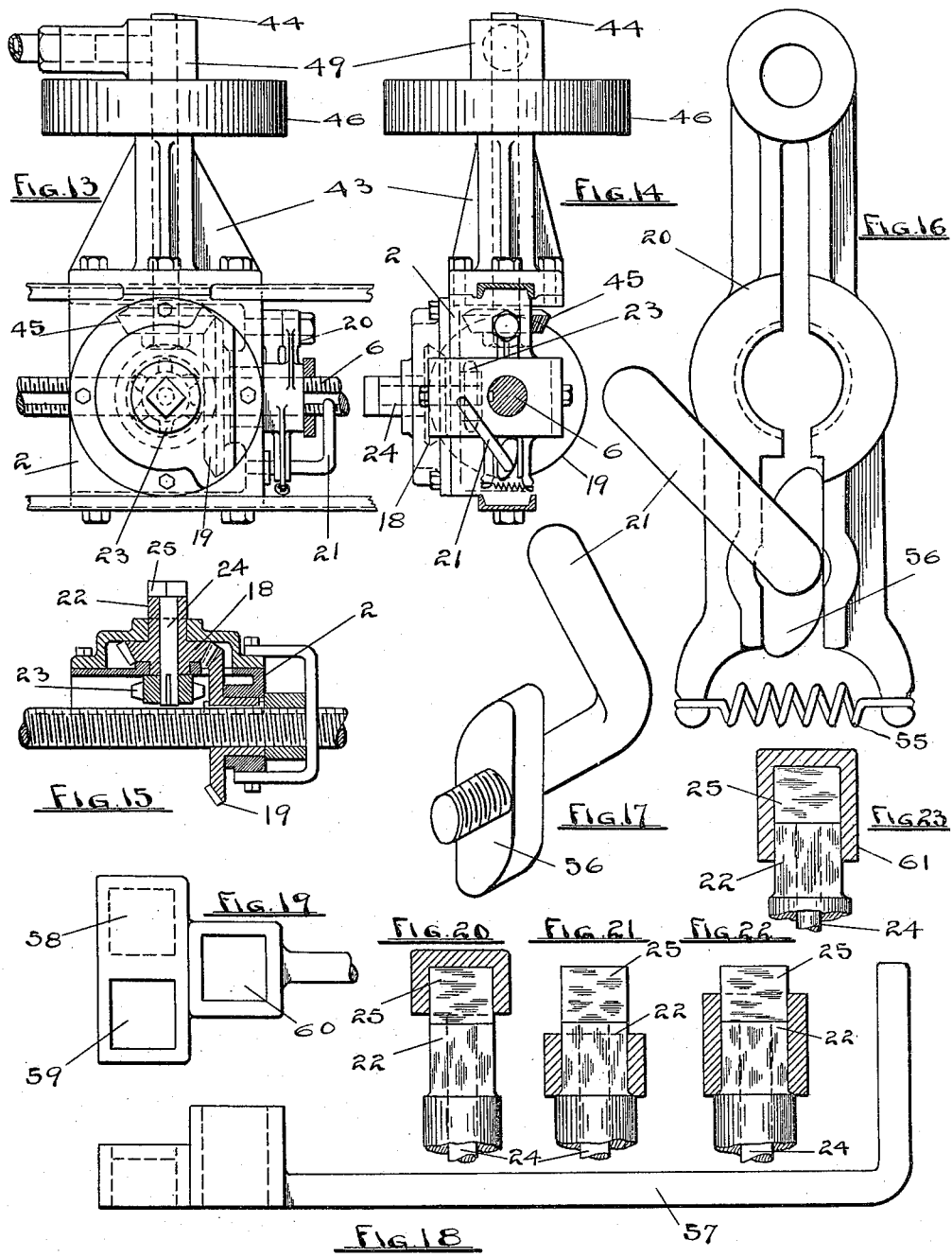

GORDON FORBES AND THOMAS HOLT, OF PORTLAND, OREGON, ASSIGNORS TO FORBES MANUFACTURING COMPANY, OF PORTLAND, OREGON.

BORING-MACHINE.

1,165,328.   Specification of Letters Patent.   Patented Dec. 21, 1915.

Application filed March 15, 1915. Serial No. 14,402.

*To all whom it may concern:*

Be it known that we, GORDON FORBES and THOMAS HOLT, citizens of the United States, residing at Portland, county of Multnomah, State of Oregon, have invented certain new and useful Improvements in Boring-Machines, of which the following is a specification.

Our invention relates to boring machines, and particularly to that class of boring machines used for boring stumps in land clearing operations.

The objects of our invention are: first, to provide a machine with which the auger may be fed into the stump by hand, either slowly by means of a screw, or rapidly by means of a chain and sprockets; second, to provide a machine with which the auger may be withdrawn rapidly by means of a chain and sprockets, and by the same means as rapidly replaced in the hole for further boring; third, to provide a machine which may be fed by either screw or chain from either end of the frame; fourth, to provide a machine that may be used as a hand power machine, or as a power driven machine, and that may be easily and quickly converted from one to the other; fifth, to provide a machine that is of such light weight as to be easily handled in the field, and of such simple construction as to be economically manufactured and used.

While our invention is principally intended for use in land clearing operations, it may obviously be used in a variety of work where a portable boring machine may be useful, as building operations and the like.

We attain the above objects by means of the construction described in these specifications, and illustrated in the accompanying drawings, which therefore become a part of this application for Letters Patent, and in which—

Figure 1 is a plan view of our invention as used for hand power; Fig. 2 is a side elevation of Fig. 1; Fig. 3 is a transverse section on line A A of Fig. 1; Fig. 4 is a transverse section on line B B of Fig. 1; Fig. 5 is a detail view of the feed screw; Fig. 6 is a detail view of the manner of securing the dogs to the frame; Fig. 7 is a plan view of our invention as used when power driven; Fig. 8 is a side elevation of Fig. 7; Fig. 9 is a detail of the attachment that converts the hand power machine into a power driven machine; Fig. 10 is a transverse section on line C C of Fig. 8; Fig. 11 is a transverse section on line D D of Fig. 7; Fig. 12 is a transverse section on line E E of Fig. 7; Fig. 13 is a detail plan of the combined hand power and power driving mechanism; Fig. 14 is a side elevation of Fig. 13; Fig. 15 is a central longitudinal section of Fig. 13; Fig. 16 is a detail elevation of the feed screw nut; Fig. 17 is a perspective view of the feed screw nut lever; Fig. 18 is an elevation of the hand crank; Fig. 19 is a plan view of the hand crank head; Fig. 20 is a detail view showing the application of the hand crank to the chain feed only; Fig. 21 is a detail view showing the application of the hand crank to the driving gears only; Fig. 22 is a detail view showing the application of the hand crank to both the chain feed and the driving gears simultaneously; Fig. 23 is a detail view showing the application of a square thimble to lock the chain feed and driving gears together.

Like characters designate like parts throughout the several views of the drawings.

The hand power machine is composed of two side bars 1, between which is the gear box 2 and end separator 3, each being bolted to the side bars. A movable crosshead 4 slides longitudinally upon the side bars, propelled by means of a chain 5, said crosshead being connected to a feed screw 6 in such a manner as to permit said screw to revolve while being fed longitudinally by said crosshead. The side bars are pointed at the end opposite that having the separator 3, as shown at 7 in Figs. 1 and 2, and dogs 8 are provided having spiked ends 9 adapted to be driven into the object being bored. Said dogs are attached to the side bars by means of hooked ends 10 entering holes in the side bars, as shown in Fig. 6. The spacer 3 between the side bars has a hub 11 in which is mounted a chain sprocket 12, said sprocket having a turned shank 13 adapted to fit the bore of hub 11, and a square hub 14 adapted to receive a hand crank for operation.

The crosshead 4, adapted to slide upon the side bars, is provided with a cap 15, said cap being adapted to fit into an annular groove 16 in feed screw 6, and thus cause the feed screw to move longitudinally with the crosshead while being free to revolve in said cap. The bolts 17 securing cap 15 to crosshead 4 are long enough to allow of loosening said cap out of engagement with slot 16 in screw 6, and thus allow the crosshead to be moved along the side bars without moving the screw.

The gear box 2 has bearings in which are mounted a bevel pinion 18 and a bevel gear 19, said bevel gear having a key adapted to engage and slide in a long keyway cut in screw 6. By means of said key the bevel gear 18 turns screw 6, and thus feeds the auger into the article being bored by means of a feed nut 20 upon the face of gear box 2. Said feed nut is of the split variety, and a lever 21 is provided for disengaging the nut from the screw.

The bevel pinion 18 has a square hub 22 adapted to receive a hand crank. A chain sprocket 23 is mounted upon a shaft 24, said shaft being journaled in the bevel pinion 18 and having a squared head 25 immediately above the squared hub 22 of bevel pinion 18, and adapted to receive the same hand crank.

The operation of our invention by hand power is as follows: Points 7 are inserted into the object to be bored and then spikes 9 of dogs 8 are driven into said object, thus securely binding the frame or side bars 1 to said object. Feed screw nut 20 is closed upon screw 6 and a hand crank placed upon squared hub 22 of bevel pinion 18. Thus by means of bevel pinion 18 and bevel gear 19 with its key engaging screw 6, said screw is revolved, and by means of screw nut 20 said screw is simultaneously fed longitudinally toward the object being bored.

The auger is secured in the end of screw 6 by means well known to the art.

The auger may be removed from the hole by reversing the motion of the hand crank, but as this (because of the screw) is a slow process, a more rapid means of removal is provided in crosshead 4 and chain 5 with its sprockets 12 and 23. To accomplish this rapid removal the feed screw nut 20 is released from the feed screw, and the hand crank placed upon the squared hub 14 of sprocket 12 or upon the squared head 25 of shaft 18 upon which sprocket 23 is mounted. Operation of either sprocket 12 or sprocket 23 moves the crosshead 4 by means of chain 5 and thus screw 6 may be rapidly withdrawn from the hole or fed back into the hole after having been withdrawn.

Branches or other obstructions protruding from the object being bored may render operation of the hand crank upon hub 22 of bevel gear 18 impossible, in which case a square thimble 61, Fig. 23, is provided for the purpose of engaging said hub 22 with hub 25, thereby locking the bevel pinion 18 securely to sprocket 23. Cap 15 upon crosshead 4 may now be disengaged from screw 6, and the screw feed nut 20 engaged with said screw. A hand crank being then applied to hub 14 of sprocket 12 will cause the screw to revolve and feed simultaneously by means of chain 5 sprocket 23, bevel pinion 18, bevel gear 19 and screw feed nut 20.

Where more rapid work is required than can be accomplished by hand power, we provide a frame wherein the hand power device above described may be easily and quickly mounted. Said frame comprises a base 26, and a mast 27 pivotally mounted upon said base at 28. Said mast is constructed of angles in such a manner as to form a guide in which the frame 1 of the boring machine may be raised or lowered. In order to conveniently mount the boring machine in said guides, we provide rollers 29 upon a shaft 30, said shaft being journaled in plates 31 bolted to side bars 1. A pipe spacer 32 is placed upon shaft 30 between plates 31. At the upper end of mast 27 is placed a drum 33 upon a crank shaft 34, said crank shaft having upon one end a ratchet wheel 35 adapted to engage with a pawl 36. A rope 37 is passed around pipe 32 and attached to drum 33. By means of said rope 37, drum 33, ratchet wheel 35, pawl 36 and crank shaft 34, frame 1 may be raised and lowered, and held in any position relative to mast 27 that may be desirable.

Frame 1 may be inclined at any desired angle about rollers 29, as shown in dotted lines in Fig. 8, and may be fastened in such position by means of points 7 on frame 1 and spikes 9 on dogs 8.

A plate 38 is slidably mounted in base 26, and clamps are provided for securely fastening said plate in position, said clamps being a bar 39, a stud 40 in plate 38 and a lever nut 41, as above in detail in Fig. 11, there being a pair of said clamps provided for said plate, as shown in Fig. 7. Mounted upon plate 38 is a gasolene engine 42, or any other convenient motor may be used, as electric or pneumatic.

A bracket 43 is provided, said bracket being adapted to carry a shaft 44 upon which is mounted a bevel pinion 45 and a belt pulley 46. Bracket 43 is adapted to be bolted to frame 1 in such a position as will bring pinion 45 into mesh with bevel gear 19 previously described as mounted within gear box 2 and as keyed slidably to screw 6. A belt 47 connects the engine pulley with the pulley 46, whereby, by means of shaft 44, bevel pinion 45, bevel gear 19 with its key, and feed screw nut 20, screw 6 is caused to revolve and advance simultaneously.

In order to preserve a proper tension in belt 47 throughout the entire range of movement of mast 27 and frame 1 an adjustable strut 48 is provided, said strut having at each end thereof a box 49, said boxes being adapted to receive the engine shaft and shaft 44 respectively.

The operation of our invention with power attachment is practically the same as when used for hand power, only; when feed screw nut 20 is engaged with feed screw 6 said feed screw is revolved and fed longitudinally simultaneously by the power from the engine, while if feed screw nut be released from feed screw 6 said screw will be revolved by power from the engine, but may be fed into or removed from the hole being bored by any one of the methods described previously for hand operation.

A brace 50 is provided to support mast 27 while dogs 8 are being placed in position, said brace being pivotally connected to frame 26 at 51, and sliding in a box 52, which box is pivoted in a bracket 53 riveted to mast 27, as shown in Figs. 8 and 10. A set screw 54 is provided to retain brace 50 within bracket 52 as described.

Feed nut 20 is made in halves as shown in Fig. 16, said halves being kept in engagement with feed screw 6 by means of spring 55, and disengaged from feed screw 6 by means of lever 21 having cam 56 integral with said lever.

A hand crank 57, Fig. 18, is provided, said hand crank having three square orifices in the head of a size to fit the square hubs 14 and 22 of the bevel pinions and the square head 25 of shaft 24.

Orifice 58 does not extend entirely through the head of the hand crank so that when applied to square head 25 it will not fit entirely over same, as shown in Fig. 20, and therefore will not engage the square hub 22 immediately beneath. In this position the hand crank will operate only the shaft 24 and sprocket 23, leaving the bevel gears idle, thereby feeding screw 6 in or out by means of chain 5 and crosshead 4.

Orifice 59 passes entirely through the hand crank head, a distance sufficient only to engage square hub 22 of bevel pinion 18, as shown in Fig. 21, and therefore will not engage square head 25 of sprocket shaft 24. In this position the hand crank will operate only the bevel pinion 18, and thereby the bevel gear 19, leaving the sprocket wheel 23 and chain 5 idle, thereby feeding screw 6 in or out by means of feed screw 20 only.

Orifice 60 passes entirely through the hand crank head a distance sufficient to engage both square hub 22 and square head 25, whereby, when feed screw nut is released from screw 6, both bevel gears and chain sprockets are operated simultaneously, therefore revolving the feed screw through the bevel gears, and feeding the screw longitudinally by means of the sprocket and chain.

Our invention may be made of any size and constructed of any materials deemed advisable and suitable for a device of this character, and while we have illustrated and described a preferred construction and arrangement of parts deemed advisable in materializing our invention, we wish to include in this application for Letters Patent all mechanical equivalents or substitutes that may fairly be considered to come within the scope and purview of our invention.

Having thus fully described our invention so that others skilled in the art may be enabled to construct and use same, what we claim as new and desire to secure by Letters Patent, is:—

1. In a boring machine feed mechanism, an auger, a bevel gear, said bevel gear having a polygonous hub, a shaft freely mounted within said bevel gear, said shaft having a polygonous head adjacent to said polygonous hub, a chain sprocket upon said shaft, a hand crank, said hand crank having a plurality of apertures of varying depths adapted to engage either one or both of said polygonous members, and means to operate said auger from said bevel gear or from said chain sprocket.

2. A boring machine comprising side bars, a feed screw intermediate said side bars, a bevel gear slidably keyed to said screw, a bevel pinion intermeshing with said bevel gear, a duality of chain sprockets, one of said sprockets being mounted concentrically with said bevel pinion, a crosshead slidably mounted upon said side bars, a chain connecting said crosshead with said sprockets, means to attach or detach said crosshead from said feed screw, and a hand crank, said crank embodying means to operate individually or simultaneously said bevel gear and said chain sprocket concentrically mounted therewith.

3. In a boring machine feed mechanism, an auger, a bevel pinion, a chain sprocket concentrically mounted relative to said bevel pinion, said bevel pinion and said chain sprocket each having a polygonous head, said heads being immediately adjacent each other, a hand crank, said hand crak embodying means to engage individually or simultaneously said adjacent polygonous head, and means to operate said auger from said pinion or from said chain sprocket.

4. A boring machine comprising a base, a mast pivotally mounted upon said base, a winch upon the upper end of said mast, a sliding plate within said base, a motor mounted upon said plate, a frame slidably and pivotally mounted within said mast, a feed screw within the frame, means to operate said feed screw, said means being a belt pulley, a shaft and a pair of intermeshing bevel gears, and an adjustable brace adapted to receive said shaft at one end and the motor shaft at the opposite end thereof.

5. In a boring machine, a base, a mast pivotally mounted on said base, a frame slidably and pivotally mounted within said mast, a shaft mounted upon said frame, a pulley upon said shaft, a motor slidably mounted upon said base, a belt between said pulley and said motor, and means to slide said motor simultaneously with any motion of said mast or frame, for the purpose of keeping a constant tension upon said belt throughout the entire range of motion of said mast on said frame.

In witness whereof we claim the above as our own, we hereunto affix our signatures in the presence of two subscribing witnesses.

GORDON FORBES.
THOMAS HOLT.

Witnesses:
W. P. RIHORN,
D. G. SEOBEY.